US008890810B2

(12) United States Patent
Yoo et al.

(10) Patent No.: US 8,890,810 B2
(45) Date of Patent: Nov. 18, 2014

(54) DISPLAY APPARATUS AND METHOD FOR CONTROLLING CURSOR MOVEMENT

(75) Inventors: Ho-june Yoo, Seoul (KR); Jong-bo Moon, Suwon-si (KR); Byuk-sun Kim, Seoul (KR); Yong-deok Kim, Anyang-si (KR); Hye-jeong Lee, Seoul (KR); Sang-on Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 13/525,668

(22) Filed: Jun. 18, 2012

(65) Prior Publication Data

US 2013/0093671 A1 Apr. 18, 2013

(30) Foreign Application Priority Data

Oct. 18, 2011 (KR) .......................... 10-2011-0106686

(51) Int. Cl.
*G06F 3/033* (2013.01)
*G06F 3/0482* (2013.01)

(52) U.S. Cl.
CPC ................................. *G06F 3/0482* (2013.01)
USPC ......................................................... 345/157

(58) Field of Classification Search
USPC ................... 345/156–167, 175; 715/856–862
See application file for complete search history.

(56) References Cited

U.S. PATENT DOCUMENTS

| 6,031,531 | A  | * | 2/2000  | Kimble ......................... 715/862 |
| 6,362,840 | B1 | * | 3/2002  | Burg et al. ..................... 715/835 |
| 6,642,947 | B2 | * | 11/2003 | Feierbach ...................... 715/861 |
| 2007/0198942 | A1 | * | 8/2007  | Morris .......................... 715/767 |
| 2008/0229254 | A1 | * | 9/2008  | Warner ......................... 715/856 |
| 2010/0060571 | A1 | * | 3/2010  | Chen et al. .................... 345/157 |
| 2011/0157011 | A1 | * | 6/2011  | Kelley .......................... 345/157 |

* cited by examiner

*Primary Examiner* — Pegeman Karimi
(74) *Attorney, Agent, or Firm* — Sughrue Mion, PLLC (57) ABSTRACT

A display apparatus and a display method capable of controlling cursor movement are disclosed. The display apparatus includes an input unit which receives an input cursor movement command, a display unit which displays at least one object and a cursor on a screen and moves the cursor according to the cursor movement command, and a control unit which controls the display unit to automatically move the cursor to a target point that corresponds to a direction of movement of the cursor within the object in response to the cursor moving into a range that is set on the basis of the object. Accordingly, a user can select and execute a specified object through an easy and convenient operation.

15 Claims, 6 Drawing Sheets

DISPLAY APPARATUS AND METHOD FOR CONTROLLING CURSOR MOVEMENT

PRIORITY

This application claims priority under 35 U.S.C. §119(a) to Korean Patent Application No. 10-2011-0106686, filed on Oct. 18, 2011, in the Korean Intellectual Property Office, the disclosure of which is incorporated herein by reference.

BACKGROUND

1. Field

The present inventive concept relates to a display apparatus and a method for controlling cursor movement. More particularly, the present inventive concept relates to a display apparatus and a method for controlling cursor movement.

2. Description of the Related Art

In general, a user operates an input device such as a mouse in order to select one of a plurality of objects that are displayed on a screen of a display apparatus such as a computer. In accordance with such an operation command of the input device, the display apparatus moves a cursor in a direction of the object that is requested by the user from among the plurality of objects. If the cursor moves into a predetermined range of the object that is requested by the user, the display apparatus executes the corresponding object in accordance with a user's operation command, which follows.

In selecting at least one of the plurality of objects using the cursor, as described above, in response to a small number of objects being displayed on the screen, or the objects are arranged at wide intervals on the screen, the user can easily move the cursor to the object that the user intends to select.

However, in response to a large number of objects being displayed on the screen, or the objects are arranged at narrow intervals on the screen, it may be not easy for the user to move the cursor to the object that the user intends to select. Further, in the case where the user moves the cursor to the object that the user intends to select, the user may not correctly select the object that the user intends to select, but may erroneously select an adjacent object due to narrow intervals between the objects.

SUMMARY

The present disclosure addresses at least the above problems and/or disadvantages and provide at least the advantages described below. Accordingly, an aspect of the present disclosure provides easy movement of a cursor for selecting a plurality of objects that are displayed on a screen of a display apparatus.

Another aspect of the present disclosure provides fixing, within the corresponding object, a cursor that moves into a predetermined range of the object.

Still another aspect of the present disclosure provides variable adjustment of a point to which a cursor is fixed in an object, according to a direction of movement of the cursor.

According to one aspect of the present disclosure, a display apparatus includes an input unit which receives an input relating to a command for moving a cursor; a display unit displaying at least one object and a cursor on a screen, and moving the cursor according to the command for moving the cursor; and a control unit which controls the display unit to automatically move the cursor to a target point that corresponds to a direction of movement of the cursor within the object in response to the cursor moving into a set range that is based on the object.

A position of the target point may be determined differently, according to a shape of the object and the direction of movement of the cursor.

The control unit may set a center point of the object as the target point in response to the object corresponding to a tetragon.

The control unit may set as the target point a point on an inside of a boundary surface of the object that is positioned in the movement direction of the cursor in response to the object corresponding to a tetragon having different width and height.

The control unit may cumulatively calculate a distance movement according to the cursor movement command in response to the command for moving the cursor being input in a state where the cursor has moved to the target point in the object, and may control the display unit to fixedly display the cursor at the target point when an absolute value of the accumulated movement distance is smaller than a preset threshold value.

The control unit may control the display unit to automatically move the displayed cursor to a point outside of the object in response to the absolute value being increased to be equal to or larger than the preset threshold value.

The control unit may fix the cursor to the target point, generate and move a virtual cursor according to the command for moving the cursor in response to the command for moving the cursor being input in a state where the cursor has moved to the target point in the object.

The control unit may replace the virtual cursor with the cursor while deleting the cursor that is fixed to the target point in response to the virtual cursor moving to a point outside of the object.

According to another aspect of the present disclosure, a method of controlling cursor movement for selecting at least one object that is displayed on a screen of a display apparatus, includes receiving an input of a cursor movement command for moving the cursor; determining a target point which corresponds to a movement direction of the cursor within the object in response to the cursor moving into a range that is set based on the object according to the cursor movement command; and automatically moving the cursor to the target point which has been determined.

A position of the target point may be determined differently, according to a shape of the object and the direction of movement of the cursor.

The step of determining the target point may set a center point of the object as the target point in response to the object corresponding to a tetragon.

The step of determining the target point may set a point on an inside of a boundary surface of the object that is positioned in the direction of movement of the cursor as the target point in response to the object corresponding to a tetragon having a different width and height.

The method for controlling cursor movement according to an aspect of the present inventive concept may further include receiving an input of the cursor movement command in a state where the cursor has moved to the target point within the object; cumulatively calculating a distance of movement according to the cursor movement command and calculating an absolute value of the accumulated distance that the cursor has moved; comparing the calculated absolute value with a preset threshold value, and fixing the cursor to the target point in response to the calculated absolute value being smaller than the preset threshold value.

The method for controlling cursor movement according to an aspect of the present disclosure may further include automatically moving the cursor to a point outside of the object in response to the absolute value being increased to be equal to or larger than the threshold value.

The step of fixing the cursor to the target point may fix the cursor to the target point, as well as generate and move a virtual cursor according to the cursor movement command.

The step of automatically moving the cursor to the outside of the object may replace the virtual cursor with the cursor while deleting the cursor that is fixed to the target point in response to the virtual cursor moving to a point outside the object.

An exemplary embodiment may additionally include a method for controlling cursor movement for selecting at least one object that is displayed on a screen of a display apparatus, including determining a target point that corresponds to a movement direction of a cursor within an object in response to a cursor moving into a range that is set on the basis of the object according to a received cursor movement command; and moving the cursor to the determined target point.

As described above, according to the display apparatus and the method for controlling cursor movement according to various exemplary embodiments of the present inventive concept, the movement of the cursor for selecting the plurality of objects displayed on the screen of the display apparatus is quite easy, and a specified object can be selected and executed through an easy and convenient operation.

BRIEF DESCRIPTION OF THE DRAWINGS

The above and other aspects, features and advantages of the present inventive concept will be more apparent from the following detailed description when taken in conjunction with the accompanying drawings, in which.

DETAILED DESCRIPTION OF THE EXEMPLARY EMBODIMENTS

Hereinafter, exemplary embodiments of the present inventive concept aredescribed in detail with reference to the accompanying drawings.

Figure 1:
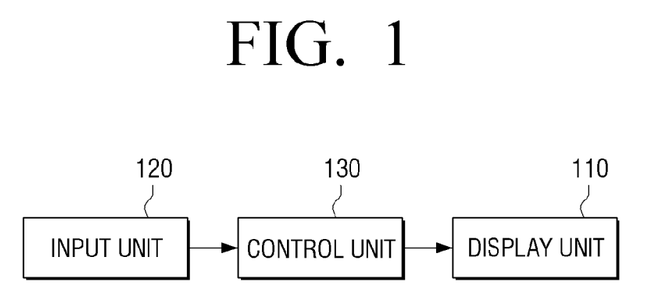
FIG. 1 is a block diagram of a display apparatus according to an exemplary embodiment of the present inventive concept.

FIG. 1 is a block diagram of a display apparatus according to an exemplary embodiment of the present disclosure.

As illustrated in FIG. 1, a display apparatus may be an Internet-connectable apparatus. The display apparatus includes a display unit 110, an input unit 120, and a control unit 130.

The display unit 110 displays at least one object that is provided on a web page on a screen. Further, the display unit 110 displays a cursor for selecting the at least one object provided on the web page on the screen. The input unit 120 receives an input of a cursor movement command for moving the cursor to select the at least one object displayed on the screen. Specifically, a user operates an input device such as a mouse in order to select one of a plurality of objects displayed on the screen. Accordingly, the input unit 120 receives the cursor movement command according to a user's operation from the input device.

The control unit 130 senses whether the cursor moves into a preset range of one of the plurality of objects according to the cursor movement command input from the input unit 120. If it is sensed that the corresponding cursor has moved into the preset range of one of the plurality of objects according to the cursor movement command input from the input unit 120, the control unit 130 variably determines the target point in the corresponding area according to a preset condition that corresponds to a movement direction of the cursor. Thereafter, the control unit 130 automatically moves the cursor to the determined target point.

Preferably, the control unit 130 fixes the cursor that has moved to the target point so that the corresponding cursor can be formed within the target area. On the other hand, according to an additional aspect of the present exemplary embodiments, the position of the target point may be differently determined according to the shape of the object and the movement direction of the cursor. Accordingly, if the cursor moves into a preset range of a specified object, the control unit 130 may determine, in a different manner, the position of the target point according to the shape of the corresponding object and the movement direction of the cursor.

In an exemplary embodiment of the present inventive concept, if it is sensed that the cursor has moved into the preset range of an object having constant width and height, the control unit 130 may set the center point of the corresponding object as the target point. Specifically, the control unit 130 can sense whether the corresponding cursor has moved into the preset range of one of the plurality of objects. This is done with reference to a storage unit (not illustrated) which stores position information of the cursor which moves according to the cursor movement command input through the input unit 120, and moves according to selectable areas and size information of the plurality of objects.

In response to it being sensed that the cursor has moved into the preset range of the object, the control unit 130 acquires the size information of the corresponding object that is stored in the storage unit (not illustrated). Thereafter, in response to it being confirmed that the object corresponds to a square having the same width and height from the acquired size information of the object, the control unit 130 sets the center point of the preset range of the object as the target point regardless of the movement direction of the cursor and the entrance direction of the object. That is, the control unit 130 may set an area as the target point, in which XY-axis coordinate values of the corresponding object are (0,0). Once the target point is set, the control unit 130 operates to move the cursor to the set target point and to fix the cursor, which has moved to the set target point.

However, the present exemplary embodiments are not limited thereto, and the control unit 130 may set the center point of the object as the target point to the extent that the object corresponds to any type of tetragons including a square. Further, the exemplary embodiments are not limited thereto, and in the case where the object is in a square shape, the control unit 130 may set the target point of the object according to the cursor movement direction. For example, in response to the cursor moving into a preset range in the entrance direction of a left-side surface of the object, the control unit 130 may set as the target area, an area in which XY-axis coordinate values are the center value of –X axis, 0. In another example, in response to the cursor moving from the 9 o'clock direction to the 3 o'clock direction and moving into the preset range in the entrance direction of the left-side surface of the object, the control unit 130 may set an area as the target area, in which the X-axis value of the object becomes the smallest value –a, and the Y-axis value becomes 0.

In another exemplary embodiment, if it is sensed that the cursor has moved into the preset range of the object that has a tetragonal shape which includes different width and height, the control unit 130 may set, as the target area, the point on an inside the boundary surface of the object that is positioned in the direction of cursor movement. Specifically, the control unit 130 may sense whether the cursor has moved into the preset range of one of the plurality of objects, with reference to the storage unit (not illustrated), which stores position information of the cursor that moves according to the cursor movement command input through the input unit 120 and that moves according to preset ranges and size information of the plurality of objects.

If it is sensed that the cursor has moved into the preset range of the object, the control unit 130 acquires the size information of the corresponding object that is stored in the storage unit (not illustrated). Thereafter, if it is confirmed that the object corresponds to a tetragon having width and height different from the acquired size information of the object, the control unit 130 may set as the target point, a point on an inside of the boundary surface of the object that is positioned in the cursor movement direction. For example, the object may be in a rectangular shape having a wide width and a low height. Further, in accordance with the cursor movement command input through the input unit 120, the cursor may move from the left side to the right side, that is, from the 9 o'clock direction to the 3 o'clock direction, and enter into the preset range in the entrance direction of the left-side surface of the object. In this case, the control unit 130 may set an area as the target point in which the X-axis value of the object becomes the smallest value –α and the Y-axis value becomes 0.

By contrast, in response to the cursor moving from the 3 o'clock direction to the 9 o'clock direction and entering into the preset range in the entrance direction of the right-side surface of the object, the control unit 130 may set an area as the target point, in which the X-axis value of the object becomes the largest value α and the Y-axis value becomes 0.

In still another example, in response to the cursor moving from the 11 o'clock direction to the 5 o'clock direction and entering into the preset range in the entrance direction of the left-side surface of the object, the control unit 130 may determine the value –β of a cross point, at which the cursor moves from the 11 o'clock direction to the 5 o'clock direction and crosses the X axis, as the X-axis value. Accordingly, the control unit 130 may set an area as the target point in which the XY-axis coordinate values of the object are (–β,0).

By contrast, in response to the cursor moving from the 1 o'clock direction to the 7 o'clock direction and entering into the preset range in the entrance direction of the right-side surface of the object, the control unit 130 may determine the value β of a cross point, at which the cursor moves from the 1 o'clock direction to the 7 o'clock direction and crosses the X axis, as the X-axis value. Accordingly, the control unit 130 may set an area as the target point, in which the XY-axis coordinate values of the object are (β,0).

Accordingly, in response to the cursor moving into the preset range of the object having a wide width and a low height, the control unit 130 may set the target point through changing the X-axis value of the corresponding object according to the direction of movement of the cursor in a state where the Y-axis value is fixed.

However, the present inventive concept is not limited thereto. In response to the cursor moving into the preset range of an object having a narrow width and a high height, the control unit 130 may set the target point through changing the Y-axis value differently, according to the direction of movement of the cursor in a state where the X-axis value of the corresponding object is fixed. Setting the target point in the object having a narrow width and a high height is the same as described above, and thus the detailed explanation thereof is omitted.

The movement command may be input through the input unit 120 in a state where the target point of the object is determined and the cursor has moved to the determined target point. If the cursor movement command is input through the input unit 120, the control unit 130 cumulatively calculates the distance of movement according to the input cursor movement command and calculates the corresponding absolute value. Thereafter, the control unit 130 compares the calculated absolute value with a preset threshold value. In response to the calculated absolute value being equal to or larger than the preset threshold value, as the result of the comparison, the control unit 130 automatically moves the cursor that is fixed to the target point of the object, to the outside of the object.

Specifically, in response to the cursor movement command being initially input through the input unit 120 in a state where the cursor is fixed to the target point of the object, the control unit 130 compares the absolute value of the movement distance according to the input cursor movement command with the preset threshold value. In response to the calculated absolute value being equal to or larger than the preset threshold value as the result of the comparison, the control unit 130 automatically moves the cursor that is fixed to the target point to the outside of the object. On the other hand, in response to the calculated absolute value being smaller than the preset threshold value, as the result of the comparison, the control unit 130 maintains the cursor in a fixed state. In this case, it is preferable that the control unit 130 stores the movement distance value according to the initially input cursor movement command in the storage unit (not illustrated).

In response to another cursor movement command being input after the initial cursor movement command is input, the control unit 130 accumulates the movement distance value according to the input cursor movement command with the pre-stored movement distance value, calculates the corresponding absolute value, and compares the calculated absolute value with the preset threshold value. If the calculated absolute value is smaller than the preset threshold value as the result of the comparison, the control unit 130 maintains the cursor in a fixed state. In this case, it is preferable that the control unit 130 stores the movement distance value according to another cursor movement command in the storage unit (not illustrated). That is, the control unit 130 stores the movement distance value according to the input cursor movement command in the storage unit (not illustrated) until the absolute value, that is calculated by accumulating the movement distances according to the cursor movement command, becomes equal to or larger than the preset threshold value.

According to an exemplary embodiment, the object in which the cursor is fixed to the target point may have a different width and height. In response to the object having wide width and low height, it is preferable that the threshold value that is preset in relation to the width is larger than the threshold value that is preset in relation to the height. Under such conditions, for example, the threshold value preset in relation to the width may be "10" and the threshold value preset in relation to the height may be "5." If the movement distance values according to the cursor movement command, i.e., XY coordinate values (3,0), (−5,3), and (1,−1), are acquired in a state where the threshold values for the width and height of the object are set, the control unit 130 adds the acquired X-axis coordinate values "3", "−5", and "1" and calculates the corresponding absolute value "1." Further, the control unit 130 adds the acquired Y-axis coordinate values "0", "3", and "−1" and calculates the corresponding absolute value "2." If the XY-axis absolute values are calculated, the control unit 130 compares the X-axis absolute value "1" with the preset threshold value "10," and compares the Y-axis absolute value "2" with the preset threshold value "5."

In response to the XY-axis absolute values being smaller than the preset threshold values, respectively, the control unit 130 maintains the cursor that is fixed to the corresponding target point. In contrast, in response to at least one of the XY-axis absolute values that are calculated under the above-described conditions being equal to or larger than the preset threshold value, the control unit 130 will automatically move the cursor that is fixed to the target point to the outside of the corresponding object.

On the other hand, according to an additional aspect of the present exemplary embodiments, in response to the cursor movement command being input through the input unit 120 in a state where the cursor is fixed to the target point of the object, the control unit 130 fixes the cursor to the target point, and generates and moves a virtual cursor according to the input cursor movement command. Specifically, in response to the cursor movement command being input through the input unit 120 in a state where the cursor is fixed to the target point of the object as described above, the control unit 130 compares the absolute value according to the input cursor movement command with the preset threshold value. In response to the absolute value being smaller than the preset threshold value as the result of the comparison, the control unit 130 generates the virtual cursor. Thereafter, the control unit 130 moves the virtual cursor according to the cursor movement command input through the input unit 120 while maintaining the cursor that is fixed to the target point. Accordingly, the user can confirm the cursor that moves according to the user's operation and the cursor that is actually fixed to the object, in order to select the object through the screen.

On the other hand, in response to the absolute value being equal to or larger than the preset threshold value as the result of the comparison, the control unit 130 may replace the virtual cursor that moves according to the cursor movement command with the actual cursor while deleting the cursor that is fixed to the target point.

Up to now, the operation of the respective constituent elements of the display apparatus that controls the movement of the cursor for selecting an object according to an exemplary embodiment of the present inventive concept has been described in detail.

Hereinafter, the operation of variably determining the target point of the object for fixing the cursor in accordance with the movement of the cursor in the display apparatus according to various exemplary embodiments, will be described in detail.

Figure 2:
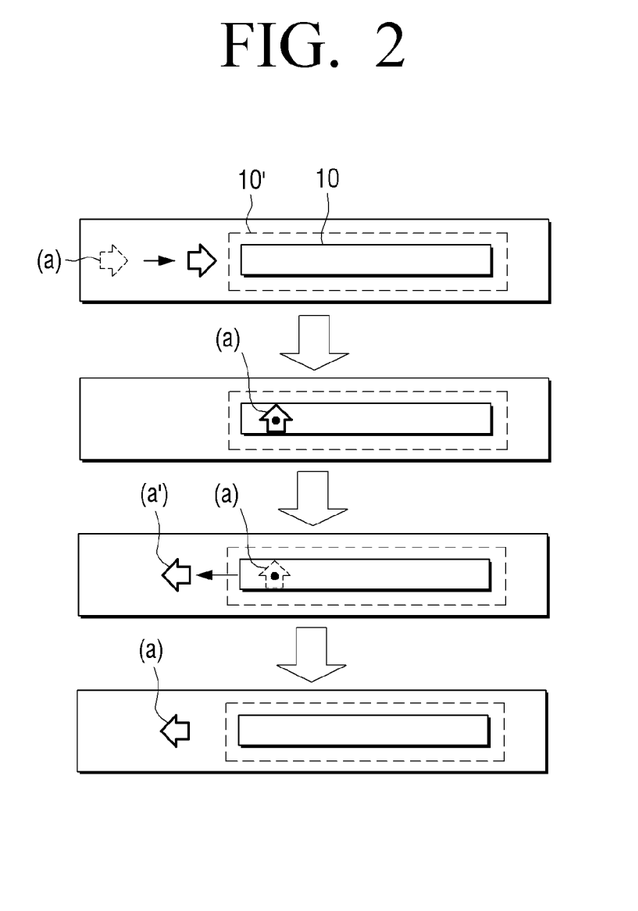
FIG. 2 is an exemplary diagram illustrating fixing of a cursor to a target point of an object or automatically fixing the cursor to a point outside of the object according to the movement of the cursor on a display apparatus according to an exemplary embodiment of the present inventive concept.

FIG. 2 is an exemplary diagram illustrating fixing of a cursor to a target point of an object, or automatic movement of the cursor to outside of the object according to the movement of the cursor on a display apparatus, according to an exemplary embodiment.

As shown in FIG. 2, the control unit 130 senses whether a cursor (a), which moves according to a cursor movement command, moves into a preset range 10' of an object 10. In response to it being sensed that the cursor (a) moves from the 9 o'clock direction to the 3 o'clock direction and entering into a preset range 10' of a rectangular object 10, the control unit 130 sets as a target point a point on the inside of the boundary surface of the object that is positioned in the direction of movement of the cursor (a), in a state where the Y axis of the object 10 is fixed. Thereafter, the control unit 130 automatically moves the cursor (a) to the set target point. As described above, in response to the cursor movement command being input in a state where the cursor (a) is fixed to the target point according to the cursor movement command, the control unit 130 generates and moves a virtual cursor (a') in a direction that corresponds to the input cursor movement command. At the same time, the control unit 130 fixes the actual cursor (a) to the target point.

On the other hand, the control unit 130 cumulatively calculates the distance of movement that the virtual cursor (a') moves, and compares the absolute value according to the accumulated movement distance value with the preset threshold value. In response to the absolute value being smaller than the preset threshold value as the result of the comparison, the control unit 130 moves the virtual cursor (a') according to the cursor movement command while fixing the actual cursor (a) to the target point. On the other hand, in response to the absolute value being equal to or larger than the preset threshold value as the result of the comparison, the control unit 130 may replace the virtual cursor (a') that moves according to the cursor movement command, with the actual cursor (a) while deleting the cursor (a) that is fixed to the target point.

Up to now, through FIG. 2, the operation of setting the target point differently, according to the direction of movement of the cursor that moves according to the cursor movement command and the shape of the object, in order to fix the corresponding cursor, and automatically moving the fixed cursor in the direction outside of the object according to another cursor movement command in the display apparatus, has been briefly described. Hereinafter, through FIGS. 2 and 3, the operation of determining the target point of the object differently, according to the direction of movement of the cursor and the operation of automatically moving the cursor that is fixed to the target point in the direction outside of the object will be described in detail.

Figure 3:
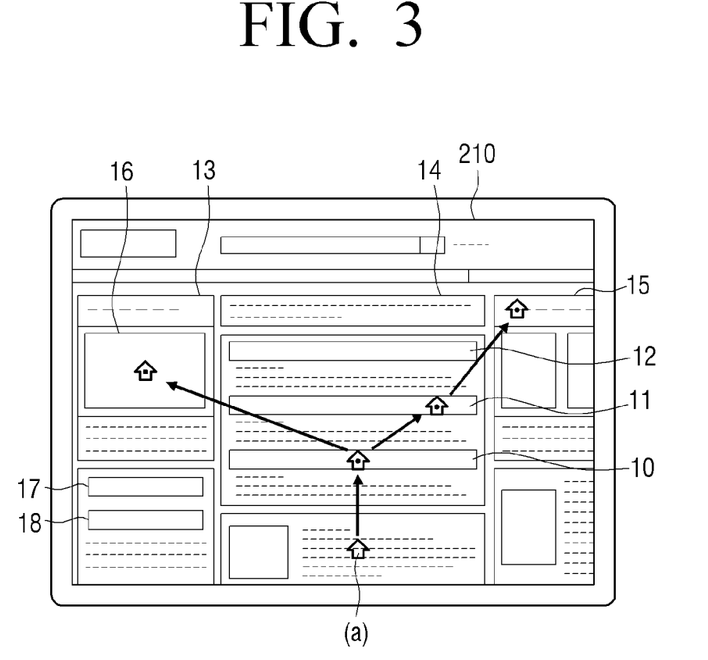
FIG. 3 is an exemplary diagram illustrating a different manner of setting a target point of an object according to the movement of a cursor on a display apparatus, according to an exemplary embodiment of the present inventive concept.

FIG. 3 is an exemplary diagram illustrating setting of a target point of an object differently, according to the movement of a cursor on a display apparatus according to an exemplary embodiment of the present inventive concept.

As illustrated in FIG. 3, on a screen 210 of a display apparatus, a plurality of objects 10 to 18 and a cursor (a) for selecting at least one object are displayed. A user can move the cursor (a) in higher, lower, left, and right directions using an input device such as a mouse, in a state where the plurality of objects 10 to 18 and the cursor (a) are displayed.

According to an exemplary embodiment of the present inventive concept, in response to it being sensed that the cursor (a) that is positioned at the lowest end has moved into a preset range of the object 10, the control unit 130 determines a target point in the preset range of the object 10, according to the direction of movement of the cursor (a) and the shape of the object 10. As illustrated, it is assumed that the object is in a rectangular shape having wide width and low height, and the cursor (a) moves from the lower side to the upper side, that is, moves from the 6 o'clock direction to the 12 o'clock direction and enters into a preset range that corresponds to the center of the lower-side surface of the object 10. In this case, the control unit 130 sets a point at which XY axes of the object 10 become "0" as the target point. Accordingly, the cursor (a) can automatically move to be fixed to the target point that corresponds to the center point of the object 10, that is, the target point that corresponds to the XY coordinate values of (0,0).

As described above, the cursor (a) may move into the preset range of the object 11 according to the user's operation command in a state where the cursor (a) is fixed to the target point that is the center point of the object 10. In response to it being sensed that the cursor (a) has moved into the preset range of the object 11, the control unit 130 sets the target point of the object 11 according to the shape of the object 11 and the direction of movement of the cursor (a). As illustrated, the object 11 is in a rectangular shape having wide width and low height, and the cursor (a) may move from the lower side to the upper side, that is, from the 7 o'clock direction to the 1 o'clock direction and enter into the preset range that corresponds to a right-side surface of the lower-side surface of object 11.

In this case, the control unit 130 may determine a point at which the value of a cross point that crosses the X axis of the object 11 is +β and the Y-axis value is "0" as the target point. Accordingly, the cursor (a) may move and be fixed to the target point that corresponds to the point at which the XY coordinate values in the right-side area of the object 11 are (+β,0) according to the control command of the control unit 130.

As described above, the cursor (a) may move into the preset range of an object 15 according to the user's operation command in a state where the cursor (a) is fixed to the target point that corresponds to XY coordinate values (+β,0) of the object 11. In response to it being sensed that the cursor (a) has moved into the preset range of the object 15, the control unit 130 sets the target point in the preset range of the object 15, in consideration of the shape of the object 15, the direction of movement of the cursor (a), and the entrance direction of the object 15 that enters into the preset range according to the movement of the cursor (a). As illustrated, the object 15 is in a rectangular shape having wide width and low height, and the cursor (a) may move from the lower side to the upper side, that is, from the 7 o'clock direction to the 1 o'clock direction and enter into the preset range that corresponds to right-side surface of the lower-side surface of object 15.

In this case, the control unit 130 may determine a point at which the value of a cross point that crosses the X axis of the object 15 is −β and the Y-axis value is "0" as the target point. Accordingly, the cursor (a) may automatically move and be fixed to the target point that corresponds to the point at which the XY coordinate values in the right-side area of the object 15 are (−β,0), according to the control command of the control unit 130.

On the other hand, as described above, the corresponding server (a) may move to the preset range of an object 16 according to the user's operation command in a state where the cursor (a) is fixed to the target point of the object 10. In response to it being sensed that the cursor (a) has moved into the preset range of the object 16, the control unit 130 determines the target point of the preset range of the object 16 according to the shape of the object 16 and the direction of movement of the cursor (a).

As illustrated, the object 16 may be in a square shape having constant width and height, and the cursor (a) may move from the right side to the left side, that is, from the 4 o'clock direction to the 10 o'clock direction and enter into the preset range that corresponds to the right-side surface of the object 16. In this case, the control unit 130 determines that the object 16 is in a square shape having the same width and height, and set the point at which the XY axes of the object 16 become "0" as the target point. Accordingly, the cursor (a) may automatically move and be fixed to the target point that corresponds to the center point of the object 16. That is, the point at which the XY coordinate values are (0,0), according to the control command of the control unit 130.

Up to now, through various embodiments, the operation of differently setting the target point for fixing the cursor according to the shape of the object and the direction of movement of the cursor, has been described in detail. Hereinafter, through FIG. 4, the operation of moving the cursor, that is fixed to the target point of the object, to the outside of a selectable area of the corresponding object, will be described in detail.

Figure 4:
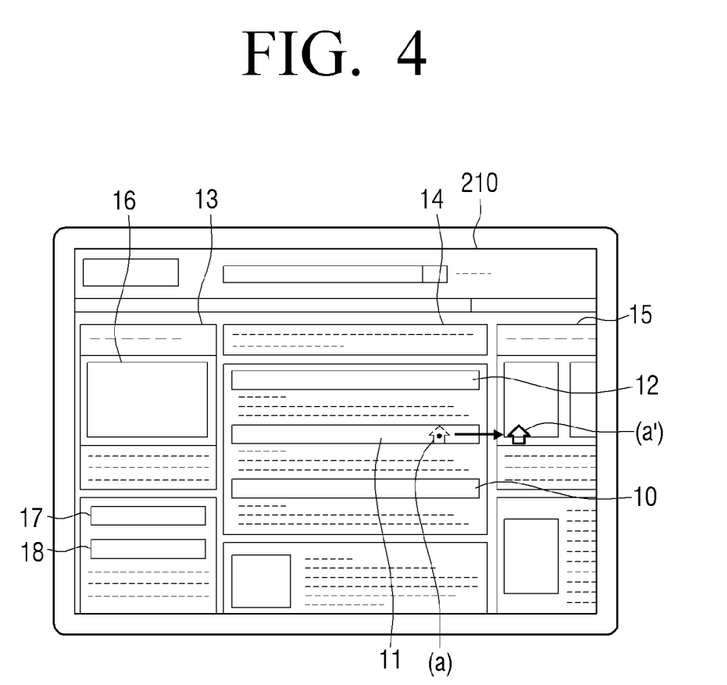
FIG. 4 is an exemplary diagram illustrating movement of a cursor fixed to a target point of an object which is outside a target area, according to an exemplary embodiment of the present inventive concept.

FIG. 4 is an exemplary diagram illustrating movement of a cursor fixed to a target point of an object outside a target area, according to an exemplary embodiment of the present inventive concept.

As illustrated in FIG. 4, the cursor (a) may be fixed to the target point that corresponds to the XY coordinate values of (−β,0) in the right-side area of the object 11. In response to the cursor movement command being initially input through the input unit 120 in a state where the cursor is fixed to the target point of the object 11, the control unit 130 calculates the absolute value from the movement distance value according to the input cursor movement command, and compares the calculated absolute value with the preset threshold value.

For example, the threshold value preset in relation to the width of the object 11 may be "10" and the threshold value preset in relation to the height may be "5." In a state where the threshold values for the width and the height are preset as described above, the control unit 130 acquires XY coordinate values that correspond to the movement values from the initially input cursor input command. In response to the distance of movement values acquired from the initially input cursor movement command, that is, XY coordinate values, being (3,0), the control unit 130 compares the X coordinate value "3" with the threshold value 10 preset in relation to the width, and compares the Y coordinate value "0" with the threshold value "5" preset in relation to the height. In response to the XY coordinate values are smaller than the preset threshold values as the result of the comparison, the control unit 130 fixes the cursor that is fixed to the target point of the object 11 regardless of the input cursor movement command.

However, the present inventive concept is not limited thereto, and in response to the XY coordinate values being smaller than the preset threshold values as the result of the comparison, the control unit 130 generates and moves a virtual cursor (a') in response to the cursor movement command input through the input unit 120. In this case, the control unit 130 visually displays that the actual cursor (a) is fixed to the target point. Accordingly, the user can confirm the cursor (a') that moves according to the user's operation and the cursor (a) actually fixed in order to select the object through the screen 210.

On the other hand, in response to a cursor movement command being additionally input through the input unit 120, the control unit 130 accumulates the movement distance value according to the previously input cursor movement command with the movement distance value according to the additionally input cursor movement command, calculates the corresponding absolute value, and compares the calculated absolute value with the preset threshold value. For example, in response to the movement distance values according to the cursor movement command input through the input unit 120, that is, the XY coordinate values, being (3,1), (1,3), and (1,2), the control unit 130 adds the X-axis coordinate values "3,", "1," and "1", and calculates the corresponding absolute value "5." Then, the control unit 130 add the acquired Y-axis coordinate values "1', "3", and "2," and calculates the corresponding absolute value "6." If the XY-axis absolute values are calculated, the control unit 130 compares the X-axis absolute value 5 with the preset threshold value "10," and compares the Y-axis absolute value "6" with the preset threshold value 5.

In response to the Y-axis absolute value 6 being equal to or larger than the preset threshold value, the control unit 130 can automatically move the cursor that is fixed to the target point of the object 11 to the outside of the selectable area of the object 11.

Up to now, the operation of variably determining the target point of the object and fixing the moving cursor to the corresponding target point according to the movement of the cursor in the display apparatus according to an exemplary embodiment of the present inventive concept has been described in detail.

Hereinafter, a method for variably determining the target point of the object and fixing the cursor to the determined target point, according to the movement of the cursor in the display apparatus, will be described in detail.

Figure 5:
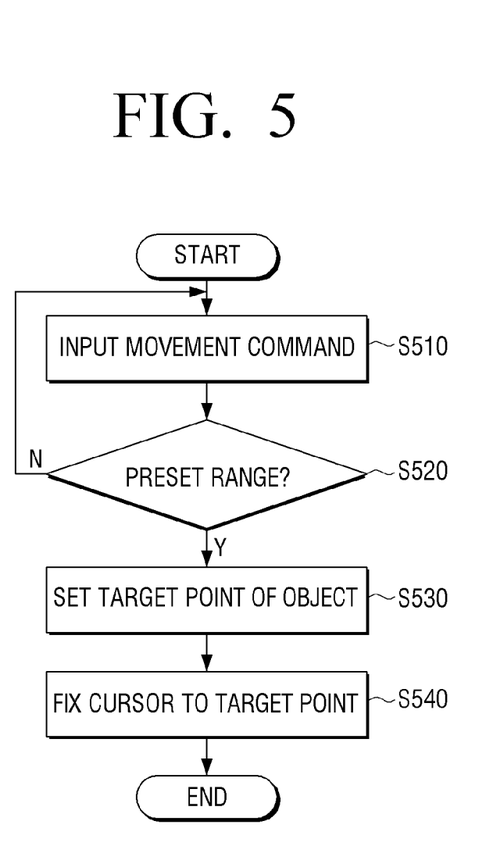
FIG. 5 is a flowchart illustrating a method for setting a target point of an object on a display apparatus, according to an exemplary embodiment of the present inventive concept.

FIG. 5 is a flowchart illustrating a method for setting a target point of an object on a display apparatus, according to an exemplary embodiment of the present inventive concept.

As illustrated in FIG. 5, the display apparatus displays at least one object that is provided on a web page and a cursor for selecting the object on the screen. The display apparatus receives a cursor movement command for moving the cursor in a state where the at least one object and the cursor for selecting the object are displayed on the screen (S510). In response to a cursor movement command being input, the display apparatus checks to determine whether the cursor moves into the preset range of one of the plurality of objects, according to the cursor movement command (S520), which has been input.

In response to it being determined that the cursor has moved into the preset range of one of the plurality of objects as the result of the determination, the display apparatus sets the target point of the corresponding object differently, according to the direction of movement of the cursor and the shape of the corresponding object (S530). Thereafter, the display apparatus automatically moves and fixes the cursor to the differently set target point according to the direction of movement of the cursor and the shape of the object (S540).

In one exemplary embodiment of the present inventive concept, in response to it being determined that the cursor that moves according to the cursor movement command has moved into the preset range of the object having a square shape with a constant width and height, the display device may set the center point of the preset range of the corresponding object as the target point, regardless of the direction of movement of the cursor. That is, the display device may set as the target point, a point at which XY-axis coordinate values of the corresponding object are (0,0).

In still another exemplary embodiment of the present inventive concept, in response to it being determined that the cursor that moves according to the cursor movement command has moved into the preset range of the object that has a tetragonal shape having different width and height, the display apparatus may set, the target to point on the inside of the boundary surface of the object that is positioned in the direction of the movement of the cursor. For example, it may be determined that the cursor has moved into the preset range of the object in a rectangular shape having a wide width and a low height, and the cursor may move from the left side to the right side, that is, from the 9 o'clock direction to the 3 o'clock direction. Further, the entrance direction of the object that corresponds to the direction of movement of the cursor may be the left-side surface of the object. In this case, the display apparatus may set the target point, where the X-axis value of the object becomes the smallest value $-\alpha$ and the Y-axis value becomes 0.

In contrast, in response to the cursor moving from the 3 o'clock direction to the 9 o'clock direction and entering into the preset range in the entrance direction of the right-side surface of the object, the display apparatus may set a target point, where the X-axis value of the object becomes the largest value $\alpha$ and the Y-axis value becomes 0. As described above, in response to the cursor moving into the preset range of the object having a wide width and a low height, the display apparatus may set the target point by differently changing the X-axis value in consideration of the direction of movement of the cursor, and the entrance direction of the object into which the cursor enters in a state where the Y-axis value is fixed.

However, the present inventive concept is not limited thereto. In response to the cursor moving into the preset range of an object having a narrow width and a high height, the display apparatus may set the target point by changing the Y-axis value differently according to the direction of movement of the cursor and the entrance direction of the object into which the cursor enters according to the direction of movement in a state where the X-axis value is fixed.

As described above, in response to the cursor moving according to the input cursor movement command has moved into the preset range of the object, the display apparatus may set the target point in consideration of the shape of the corresponding object, the direction of movement of the cursor, and the entrance direction of the object into which the cursor enters according to the direction of movement of the cursor. In response to the target point being set, the display apparatus may move the cursor to the set target point and fix the cursor to the target point.

Up to now, the method of variably determining the target point of the object and fixing the moving cursor to the determined target point according to the movement of the cursor in the display apparatus has been described in detail. Hereinafter, a method for moving the cursor that is fixed to the target point of the object to the outside of the selectable area of the corresponding object will be described in detail.

Figure 6:
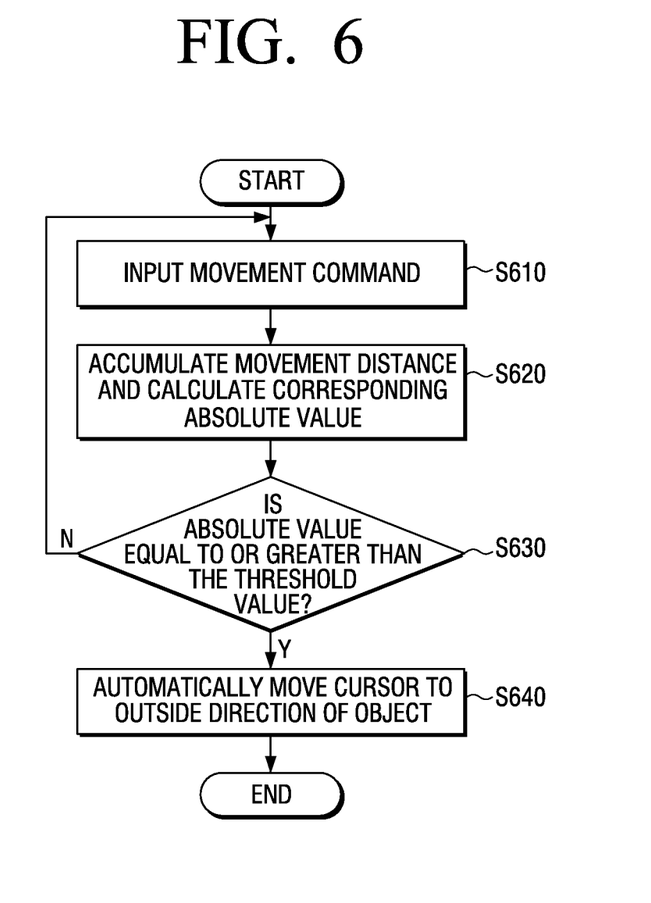
FIG. 6 is a flowchart illustrating a method for moving a cursor that is fixed to a target point of an object to a point outside of an object selectable area, according to an exemplary embodiment of the present inventive concept.

FIG. 6 is a flowchart illustrating a method for moving a cursor that is fixed to a target point of an object, to a location outside of an object selectable area, according to an exemplary embodiment of the present inventive concept.

As illustrated in FIG. 6, the display apparatus receives from the user (S610) an input of the cursor movement command for moving the cursor. In response to the cursor movement command for moving the cursor being input, the display apparatus accumulates the distance of movement values according to the input cursor movement command, and calculates the corresponding absolute value (S620). Thereafter, the display apparatus checks whether the absolute value is smaller than the preset threshold value by comparing the calculated absolute value with the preset threshold value (S630). In response to the calculated absolute value being smaller than the preset threshold value as the result of the checking, the display apparatus maintains the cursor in a fixed state to the target point. On the other hand, in response to the calculated absolute value being equal to or larger than the preset threshold value as the result of the comparison, the display apparatus automatically moves the cursor that is fixed to the target point to the outside of the corresponding object (S640).

According to an exemplary embodiment of the present inventive concept, the object in which the cursor is fixed to the target point may have different width and height. In response to the object having wide width and low height, it is preferable that the threshold value that is preset in relation to the width is larger than the threshold value that is preset in relation to the height. Under such conditions, for example, the threshold value preset in relation to the width may be "10" and the threshold value preset in relation to the height may be "5." In response to the movement distance values according to the cursor movement command, that is, XY coordinate values (3,0), (−5,3), and (1,−1), are acquired in a state where the threshold values for the width and height of the object being set, the display apparatus adds the acquired X-axis coordinate values "3,", "−5," and "1" and calculates the corresponding absolute value "1." Further, the display apparatus adds the acquired Y-axis coordinate values "0,", "3," and "−1" and calculates the corresponding absolute value "2." In response to the XY-axis absolute values being calculated as described above, the display apparatus compares the X-axis absolute value "1" with the preset threshold value "10," and compares the Y-axis absolute value "2" with the preset threshold value "5."

In response to the XY-axis absolute values being smaller than the preset threshold values, respectively, the display apparatus maintains the cursor that is fixed to the corresponding target point. However, the present inventive concept is not limited thereto. In response to the XY-axis absolute values being smaller than the preset threshold values, respectively, the display apparatus generates and moves a virtual cursor according to the cursor movement command input according to the user's operation. At this time, the display apparatus visually displays that the actual cursor is fixed to the target point. Accordingly, the user can confirm the cursor that moves according to the user's operation and the cursor actually fixed to the object, to select the object through the screen.

In contrast, in response to at least one of the XY-axis absolute values that are calculated under the above-described conditions being equal to or larger than the preset threshold value, the display apparatus automatically moves the cursor that is fixed to the target point, to the outside of the corresponding object.

As described above, in response to at least one of the XY-axis absolute values being smaller than the preset threshold values in a state where the actual cursor is fixed to the target point and the generated virtual cursor moves according to the cursor movement command, the display apparatus may replace the virtual cursor with the actual cursor while deleting the virtual cursor fixed to the target point.

While the present disclosure has been shown and described with reference to certain embodiments thereof, it will be understood by those skilled in the art that various changes in form and detail may be made therein without departing from the spirit and scope of the present disclosure, as defined by the appended claims.

What is claimed is:

1. A display apparatus comprising:
    an input unit receiving an input of a cursor movement command;
    a display unit displaying at least one object and a cursor on a screen and moving the cursor according to the cursor movement command; and
    a control unit controlling the display unit to automatically move the cursor to a target point that corresponds to a movement direction of the cursor within the object if the cursor moves into a range that is set on the basis of the object,
    wherein a position of the target point is differently determined according to a shape of the object and the movement direction of the cursor, and
    wherein, in response to the object being a polygon having unequal sides, an inner point of a boundary of the object which is closest from a direction of the cursor movement is set as the target point.

2. The display apparatus as claimed in claim 1, wherein the control unit sets a center point of the object as the target point in response to the object corresponding to a tetragon.

3. The display apparatus as claimed in claim 1, wherein the control unit sets a point on an inside of a boundary surface of the object that is positioned in the movement direction of the cursor as the target point if the object corresponds to a tetragon having different width and height.

4. The display apparatus as claimed in claim 1, wherein the control unit cumulatively calculates a movement distance according to the cursor movement command in response to the cursor movement command being input in a state where the cursor has moved to the target point in the object, and controls the display unit to fixedly display the cursor at the target point when an absolute value of the accumulated movement distance is smaller than a preset threshold value.

5. The display apparatus as claimed in claim 4, wherein the control unit controls the display unit to automatically move the displayed cursor to a point outside of the object in response to the absolute value being increased to be equal to or larger than the threshold value.

6. The display apparatus as claimed in claim 1, wherein the control unit fixes the cursor to the target point, generates and moves a virtual cursor according to the cursor movement command in response to the cursor movement command being input in a state where the cursor has moved to the target point in the object.

7. The display apparatus as claimed in claim 6, wherein the control unit replaces the virtual cursor with the cursor while deleting the cursor that is fixed to the target point in response to the virtual cursor moving to the outside of the object.

8. A method for controlling movement of a cursor for selecting at least one object that is displayed on a screen of a display apparatus, comprising:
    receiving an input cursor movement command for moving the cursor;
    determining a target point that corresponds to a direction of movement of the cursor within the object in response to the cursor moving into a range that is set on the basis of the object according to the cursor movement command; and
    automatically moving the cursor to the determined target point, wherein a position of the target point is determined differently according to a shape of the object and the direction movement of the cursor, and
    wherein, in response to the object being a polygon having unequal sides, an inner point of a boundary of the object which is closest from direction of the cursor movement is set as the target point.

9. The method for controlling cursor movement as claimed in claim 8, wherein the step of determining the target point sets a center point of the object as the target point in response to the object corresponding to a tetragon.

10. The method for controlling cursor movement as claimed in claim 8, wherein the step of determining the target point sets a point on an inside of a boundary surface of the object that is positioned in the movement direction of the cursor as the target point if the object corresponds to a tetragon having different width and height.

11. The method for controlling cursor movement as claimed in claim 8, further comprising:
   receiving an input of the cursor movement command in a state where the cursor has moved to the target point in the object;
   cumulatively calculating a movement distance according to the cursor movement command and calculating an absolute value of the accumulated movement distance; and
   comparing the calculated absolute value with a preset threshold value, and fixing the cursor to the target point in response to the calculated absolute value being smaller than the preset threshold value.

12. The method for controlling cursor movement as claimed in claim 11, further comprising automatically moving the cursor to outside of the object in response to the absolute value being increased to be equal to or larger than the threshold value.

13. The method for controlling cursor movement as claimed in claim 12, wherein the step of fixing the cursor to the target point further comprises fixing the cursor to the target point, generating and moving a virtual cursor according to the cursor movement command.

14. The method for controlling cursor movement as claimed in claim 13, wherein the step of automatically moving the cursor to the outside of the object further comprises replacing the virtual cursor with the cursor while deleting the cursor that is fixed to the target point in response to the virtual cursor moving to the outside of the object.

15. A method for controlling cursor movement for selecting at least one object that is displayed on a screen of a display apparatus, comprising: determining a target point that corresponds to a direction of movement of a cursor within an object in response to a cursor moving into a range that is set on the basis of the object according to a received cursor movement command; and
   moving the cursor to the determined target point, wherein a position of the target point is determined differently according to a shape of the object and the direction of movement of the cursor, and
   wherein, in response to the object being a polygon having unequal sides, an inner point of a boundary of the object which is closest from a direction of the cursor movement is set as the target point.

* * * * *